(12) United States Patent
Allingham

(10) Patent No.: US 6,247,086 B1
(45) Date of Patent: Jun. 12, 2001

(54) PCI BRIDGE FOR OPTIMIZED COMMAND DELIVERY

(75) Inventor: Donald Allingham, Fort Collins, CO (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/190,465

(22) Filed: Nov. 12, 1998

(51) Int. Cl.$^7$ .................................................. G06F 13/38
(52) U.S. Cl. .......................................... 710/128; 710/129
(58) Field of Search .................................... 710/129, 126, 710/128, 53, 56, 57

(56) References Cited

U.S. PATENT DOCUMENTS

| | | | |
|---|---|---|---|
| 5,835,741 | * 11/1998 | Elkhoury et al. | 710/129 |
| 5,884,027 | * 3/1999 | Garbus et al. | 709/250 |
| 6,055,590 | * 4/2000 | pettey et al. | 710/56 |

OTHER PUBLICATIONS

Information Product Catalog: Intel 21154 PCI–to–PCI Bridge, Preliminary Datasheet, 168 pages, 1998.

* cited by examiner

*Primary Examiner*—Robert Beausoleil
*Assistant Examiner*—X. Chung-Traus
(74) *Attorney, Agent, or Firm*—Patton Boggs LLP

(57) ABSTRACT

The invention provides a PCI bridge chip for communicating command data between a primary PCI bus and a secondary PCI bus. A primary command transaction logic manages command data transfers from the primary PCI bus to the secondary PCI bus. The primary delayed transaction logic has a plurality of primary buffers for buffering command transactions to be issued on the secondary PCI bus selectively. A secondary command transaction logic manages command data transfers from the secondary PCI bus to the primary PCI bus. The second delayed transaction logic has a plurality of secondary buffers for buffering command transactions to be issued on the primary PCI bus selectively. The primary and secondary command transaction logic can for example include three buffers to buffer transaction commands in the appropriate direction. The bridge chip further provides for coupling large burst data through a memory section and to external an external RAM (or alternatively internal memory).

20 Claims, 4 Drawing Sheets

PCI BRIDGE FOR OPTIMIZED COMMAND DELIVERY

BACKGROUND OF THE INVENTION

PCI stands for "peripheral component interface" defined by the PCI Special Interest Group in an effort to stem development of various local bus architectures. The PCI bus may be connected to adapters requiring fast inter-adapter access and/or system memories with accesses near to the host processor native bus speed. Read and write transfers over the PCI bus are burst transfers with any negotiated length defined by the initiating and target device. The prior art is familiar with PCI bus architectures.

The prior art is also familiar with PCI bridge chips that connect together two PCI buses. These bridge chips can be used, for example, in transferring data from an initiating PCI bus to a target PCI bus. One prior art bridge chip is the DEC21154 chip from Intel, for example. Such prior art bridge chips generally provide for sequential transfer of large bursts of data across the bridge; though they cannot effectively handle multiple delayed requests and completions without regard to the order in which they were received or completed.

Some prior art PCI bridges do not provide for delayed transactions, which are instead handled sequentially. Other prior art PCI bridges implement delayed transactions, but place ordering restrictions on either the requests or the completions. These bridges thus either implement a single delayed transaction, or multiple delayed transactions which require completion in a specific order relative to being received on the initiating bus and completion on the target bus.

The prior art bridge chips present a problem, for example, in SCSI RAID controller systems—known in the art—where the primary data path is not across the bridge. SCSI (Small Computer System Interface) defines a bus interface that is typically used between a host computer and associated data storage devices, such as the RAID (Redundant Array of Inexpensive or Independent Disks). In dual PCI bus SCSI RAID controller systems, the bridge is used to transfer small command blocks between the central processing unit ("CPU") of the host computer and the other devices in the system. A single large burst provided by prior art PCI bridges offers little performance advantage to SCSI RAID controller systems.

SCSI RAID controller systems would thus benefit from a PCI bridge chip which processes multiple command blocks simultaneously; and one object of the invention is thus to provide such a PCI bridge chip.

Another object of the invention is to provide a PCI bridge chip that sacrifices large data bursts in favor of multiple, small bursts, that are typical of command traffic seen in a SCSI RAID system.

Yet another object of the invention is to provide a PCI bridge chip that handles multiple SCSI requests efficiently and in parallel, instead of sequentially as in the prior art. Still another object of the invention is to provide an improved RAID controller with increased bandwidth and I/O's (inputs and outputs) per second.

These and other objects will become apparent in the description that follows.

SUMMARY OF THE INVENTION

In one aspect, the invention provides a PCI bridge chip for communicating command data between a primary PCI bus and a secondary PCI bus. A primary command transaction logic manages command data transfers from the primary PCI bus to the secondary PCI bus. The primary delayed transaction logic has a plurality of primary buffers for buffering command transactions to be issued on the secondary PCI bus selectively. A secondary command transaction logic manages command data transfers from the secondary PCI bus to the primary PCI bus. The second delayed transaction logic has a plurality of secondary buffers for buffering command transactions to be issued on the primary PCI bus selectively.

In another aspect, the primary command transaction logic can include three primary buffers, each with a memory length of 128 bytes, for example.

In a similar aspect, the secondary command transaction logic can include three secondary buffers, each with a memory length of 128 bytes, for example.

In still another aspect, the primary command transaction logic includes a primary PCI interface, that interfaces with the primary PCI bus, and a secondary PCI interface that interfaces with the secondary PCI bus. A primary to secondary delayed transaction logic manages command data through the primary buffers, in this aspect.

The primary command transaction logic can further include a primary buffer management and completion compare logic to match an incoming request with completed transactions in the primary buffers. The primary command transaction logic completes a PCI transaction when a match is found, storing the incoming request in one of the primary buffers, if available, and issues a retry on the primary PCI bus when a match is not found. The primary command transaction logic issues a retry on the primary PCI bus when a match is not found and when none of the primary buffers are available.

In yet another aspect, the primary command transaction logic includes primary transaction arbitration and ordering logic to route command data transactions within the primary buffers.

In still another aspect, the primary command transaction logic includes one or more primary write buffers to store posted writes that are not delayed transactions. At the appropriate time, the posted writes compete for access to the secondary bus and the primary transaction arbitration and ordering logic routes posted writes onto the secondary PCI bus.

In another aspect, the secondary command transaction logic includes a "secondary PCI interface, to interface with the secondary PCI bus, and a primary PCI" interface to interface with the primary PCI bus. A secondary to primary delayed transaction logic manages command data through the secondary buffers, in this aspect.

The secondary command transaction logic can further include secondary buffer management and completion compare logic to match an incoming request with completed transactions in the secondary buffers. The secondary command transaction logic completes a PCI transaction when a match is found, stores the incoming request in one of the secondary buffers, if available, and issues a retry on the secondary PCI bus when a match is not found. The secondary command transaction logic issues a retry on the secondary PCI bus when a match is not found and when none of the secondary buffers are available.

In another aspect, the secondary command transaction logic includes secondary transaction arbitration and ordering logic to route command data transactions within the secondary buffers. The secondary command transaction logic can for example include one or more secondary write buffers to store posted writes that are not delayed transactions. At the appropriate time, the posted writes compete for access on the primary bus and the secondary transaction arbitration and ordering logic routes posted writes onto the primary PCI bus.

A bridge chip of the invention can further include a memory controller section for coupling non-command data to memory connected to the bridge chip. By way of example, the memory can be RAM or SDRAM; and the non-command data can include large burst data. This memory can alternatively be made integrally within the bridge chip.

In another aspect, a method is provided for communicating command data between a primary PCI bus and a secondary PCI bus, including the steps of: routing command data from the primary PCI bus to the secondary PCI bus through a plurality of primary buffers; buffering, within the primary buffers, command transactions to be issued on the secondary PCI bus; routing command data transfers from the secondary PCI bus to the primary PCI bus through a plurality of secondary buffers; and buffering, within the secondary buffers, command transactions to be issued on the primary PCI bus.

In other aspects, the invention includes the step of routing large data bursts from the primary PCI bus into memory, and/or routing large data bursts from the secondary PCI bus into the memory.

The invention is next described further in connection with preferred embodiments, and it will become apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which.

DETAILED DESCRIPTION OF THE INVENTION

Figure 1:
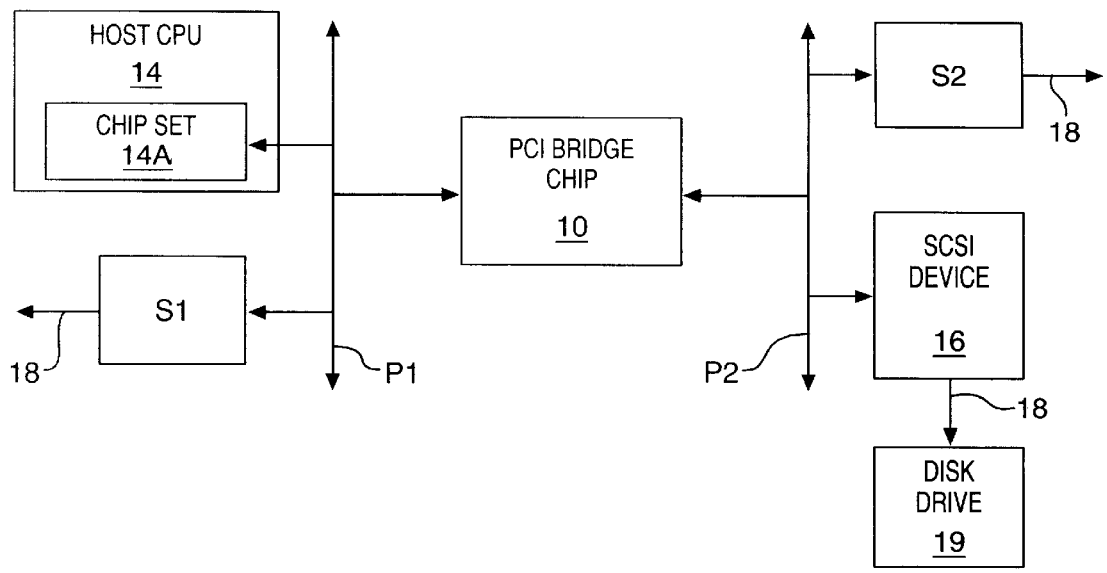
FIG. 1 illustrates the operation of a prior art PCI bridge chip as connected between two PCI buses.

FIG. 1 shows a prior art PCI bridge chip 10 connected between two PCI buses P1 and P2. As known in the art, a host CPU 14 (e.g., a central processing computer board with a Pentium microprocessor) can connect to the PCI bus P1 through its support chip set 14a, as shown. One exemplary chip set 14a, for example, is the Intel 440LX chip set.

Various devices can also connect to the PCI buses P1, P2. By way of example, devices S1 and S2 connect, respectively, to PCI bus P1 and P2 and the chip set 14a can drive the devices Si and S2 across the buses P1, P2. Devices S1, S2 can for example be SCSI or Fibre Channel chips which interface to a storage bus 18 (typically either SCSI or Fibre Channel), as shown. Storage devices typically connect to SCSI buses 18, as illustrated by SCSI device 16 connected to bus P2. SCSI device 16 interfaces to SCSI bus 18 which connects to disk drive 19. In a typical example, the host CPU 14 issues a write command to the device 16 over PCI buses P1 and P2 through bridge chip 10.

In operation, bridge chip 10 transfers data and commands between bus P1 and bus P2. Typically, such transfers and commands are made sychronously between buses, though asynchronous bus operation is possible. The bridge chip 10 provides for high data throughput between buses P1, P2 via large data buffers, as shown in FIG. 1A.

Figure 1A:
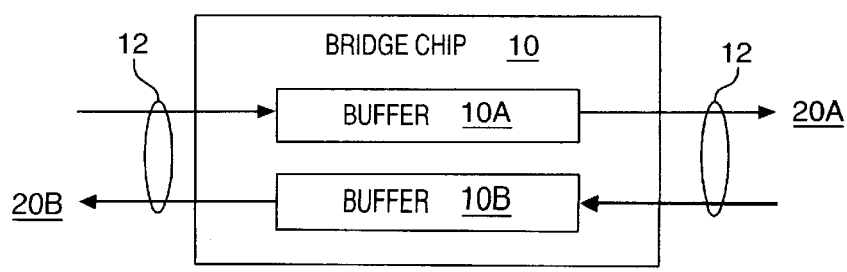
FIG. 1A illustrates further detail about the buffers within the bridge chip of FIG. 1.

FIG. 1A illustrates data throughput across the bridge chip 10. One buffer 10a buffers data along bus 12 in one direction 20a; and another buffer 10b buffers data along bus 12 in the other direction 20b. Data within buffers 10a, 10b is distributed on the bus 12 in a first-in-first-out ("FIFO") fashion; and data can only be added to the buffer 10a, 10b provided there is available memory space. In most prior art bridge chips, data within the buffers 10a, 10b must drain before being used for subsequent reads and writes. Certain prior art bridge chips permit multiple operations that are queued, one after the other, within the buffer 10a or 10b.

Figure 2:
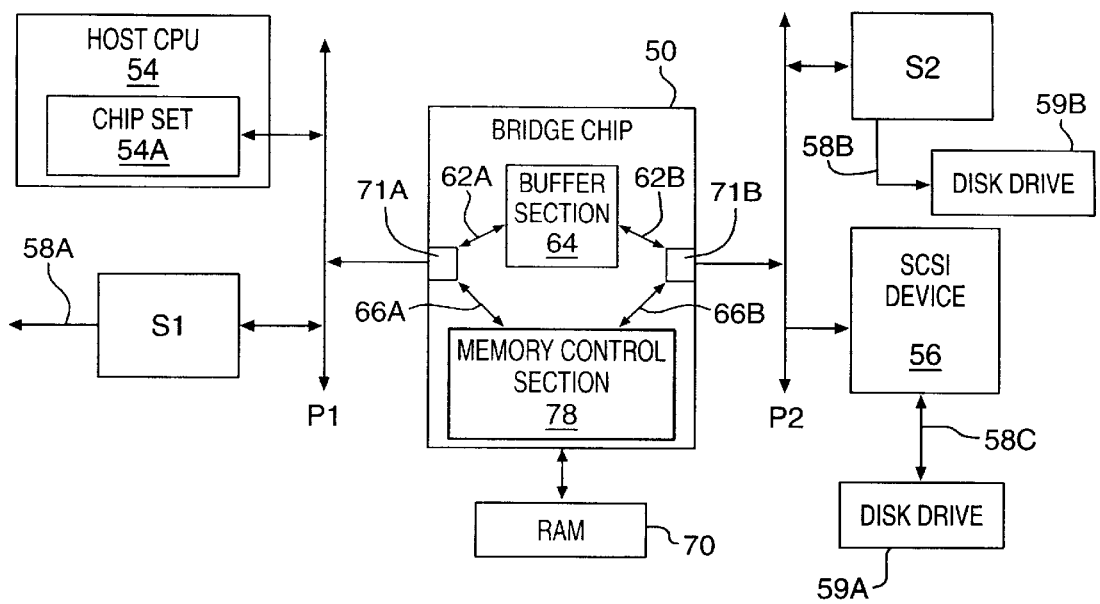
FIG. 2 illustrates a PCI bridge constructed according to the invention and connected for multiple and parallel small bursts of data across two PCI buses.

FIG. 2 shows a PCI bridge chip 50 constructed according to the invention and coupled between two PCI buses P1 and P2. As above, a host CPU 54 controls device operations on the buses P1, P2 through interface with its chipset 54a. By way of example, CPU 54 and chipset 54a can control and/or drive (a) devices S1 and S2, coupled to the buses P1, P2, respectively, and (b) SCSI device 56. As above, devices S1, S2 can for example be SCSI or Fibre Channel chips which interface to SCSI buses 58a, 58b, as shown. Storage devices typically connect to SCSI buses 58. By way of example, SCSI device 56, connected to bus P2, interfaces to SCSI bus 58c which connects to disk drive 59a; and S2 connects to disk drive 59b via SCSI bus 58b. In a typical example, the host CPU 54 issues a write or read command to the device 56 over PCI buses P1 and P2 through bridge chip 50.

Unlike the chip 10 of FIG. 1, PCI bridge chip 50 passes relatively small, but frequent command data (hereinafter "Command Data") across bridge bus 62 (through buffer section 64, described below) and communicates other, relatively large data (hereinafter "Large Burst Data") along bridge bus 66 to memory control section 78.

Command Data is relatively small, on the order of a few to several bytes; while Large Burst Data can be on the order of one thousand bytes, or more. PCI Bridge Chip 50 includes PCI interfaces 71a, 71b to interface with buses P1, P2, respectively. Interfaces 71a, 71b operate to route Command Data and Large Burst Data onto the appropriate bus 62, 66 by the PCI address. By way of example, CPU 54 can specify that Command Data has an address between 0–1000 and that Large Burst Data has an address between 3000–4000; and PCI interfaces interpret the address to route the data appropriately. Specifically, Command Data from bus P1 which crosses the bridge chip 50 is first routed on bus 62a (the "primary" bus) then through the bridge section 64, and then onto bus 62b (the "secondary" bus). Large Burst Data on the other hand, is routed onto bus 66a, through memory control section 78, and into RAM 70; and this data can then be accessed and transmitted along bus 66b and onto bus P2.

Large Burst Data transmitted on bus 66 is cached in RAM 70. Accordingly, if Large Burst Data is needed again, it may be accessed quickly within RAM 70 without requiring access from the target disk drive, for example. This is one reason why Large Burst Data does not go across the Buffer Section 64. A second reason is that data cannot be written to SCSI devices, such as device 56, as they are not target devices (i.e., devices which can accept data written to them). Rather, SCSI device 56 is an initiator devices which must acquire data on its own. Therefore, the only way devices S1 and 56 can talk to each other is through an intermediate memory, such as RAM 70. By way of example, with the system of the invention, SCSI device S1 can write data to RAM 70 and SCSI device S2 can read that data out of RAM 70. Large Burst Data is thus not transmitted directly across the bridge bus 62 and buffer section 64. Only Command Data between the CPU 54 and the SCSI device (and vice versa) crosses the buffer section 64.

Figure 2A:
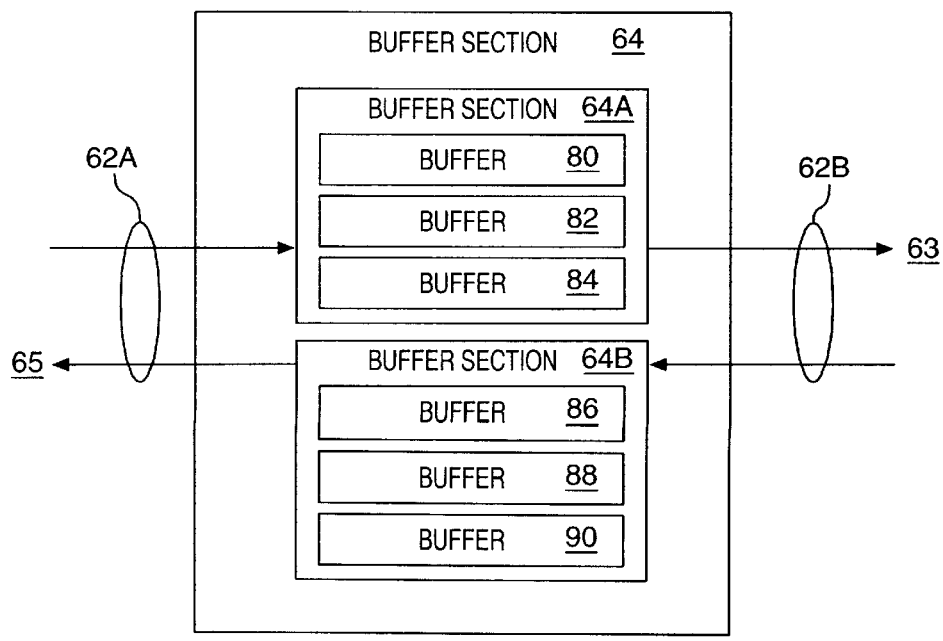
FIG. 2A illustrates further detail about the buffers within the bridge chip of FIG. 2.

FIG. 2A illustrates further detail about the buffer section 64 of the PCI bridge chip 50 of FIG. 2. Command Data transmitted along bus 62 in direction 63 is buffered within buffer section 64a; while Command Data along bus 62 in direction 65 is buffered within buffer section 64b. Section 64a contains three buffers 80, 82, 84; and section 64b contains three buffers 86, 88, 90. The buffers 80, 82, 84, 86, 88, 90 are preferably of fixed length, such as 128 bytes.

In operation, a first command from chipset 54a to SCSI device 56, for example, can be buffered within buffer 80 prior to attempting transfer onto bus P2. When a second command enters the bridge chip 50, and yet the first command within buffer 80 is not completely drained, this second command is buffered within buffer 82. Another command can be buffered within buffer 84. Likewise, three commands can be loaded within buffers 86, 88, 90 for commands along the other direction 65. In this manner, six outstanding commands can be loaded within the bridge chip 50 (three in each direction); and these commands can be processed in any desired order (i.e., they can be prioritized).

By way of example, if the command within buffer 80 pertains to SCSI device 56 and its disk drive 59a—and yet that drive 59a is busy—then only one cycle need be expended on the buffer 80 Command Data before the next buffer 82 goes on line, and so on. In the prior art, no further transactions could occur from the bridge chip until the busy disk drive responds. In bridge chip 50, this does not happen, since the bridge can execute other pending cycles to other devices when the drive 59a is busy, supporting higher Command Data throughput.

There are typically many commands for each Large Data Burst (about one thousand bytes). Typical Command Data is a register read or write, containing about four bytes, or a read command status (i.e., informing of a completed or succeeded task), containing about twenty bytes. The prior art PCI bridge chips do not provide for significant I/O throughput (i.e., transactions per second), while PCI bridge 50 increases I/O throughput without increasing bandwidth along the bus 62.

Those skilled in the art should appreciate that additional or fewer buffers 80–90 can be implemented within the buffer section 64 as a matter of design choice. Further, the buffer size can also be adjusted for design choice. It should be apparent that these changes are within the scope of the invention.

Those skilled in the art should also appreciate that RAM 70, FIG. 2, can alternatively be integrated within bridge chip 50 such that the bridge chip includes the buffer section 64, memory control section 78 and RAM 70 as a single integrated circuit.

PCI implements delayed transactions to improve bus performance. A delayed transaction occurs when a master (e.g., CPU 54a) initiates a transaction to a slave (e.g., devices S1, S2, 56) that cannot respond immediately. The slave captures the transaction request information (such as address, command, byte enables, and data) and "tells" the master to retry the cycle later. The slave proceeds to execute the transaction (on the target bus in the case of a PCI to PCI bridge), and stores the resulting information. When the master attempts the cycle again, the slave has the data that is needed, and proceeds to complete the transaction.

Figure 3:
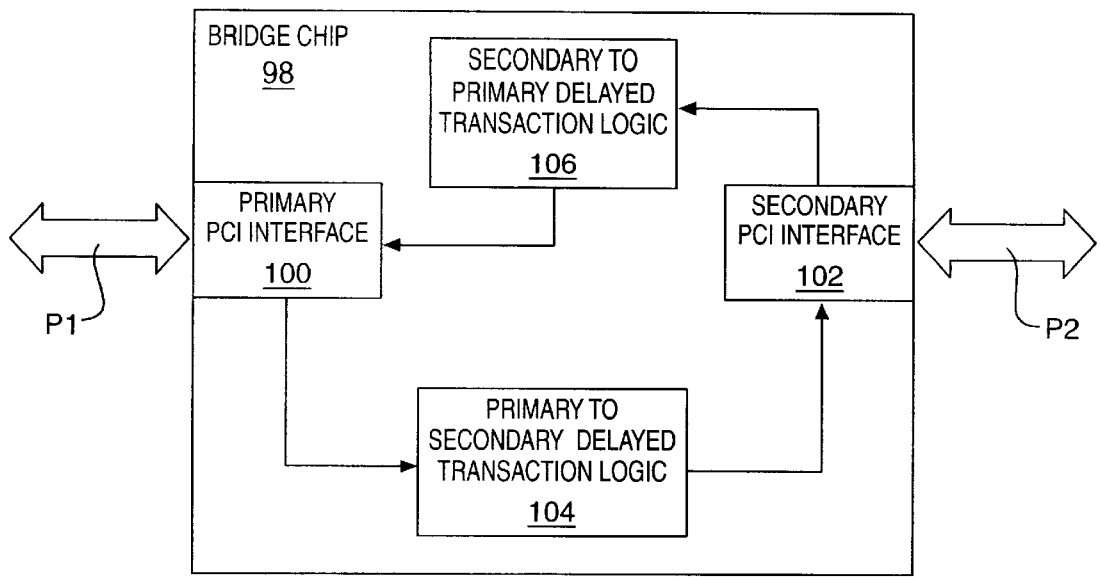
FIG. 3 illustrates command flow logic between primary and secondary PCI interfaces of the bridge chip of FIG. 2.
Figure 4:
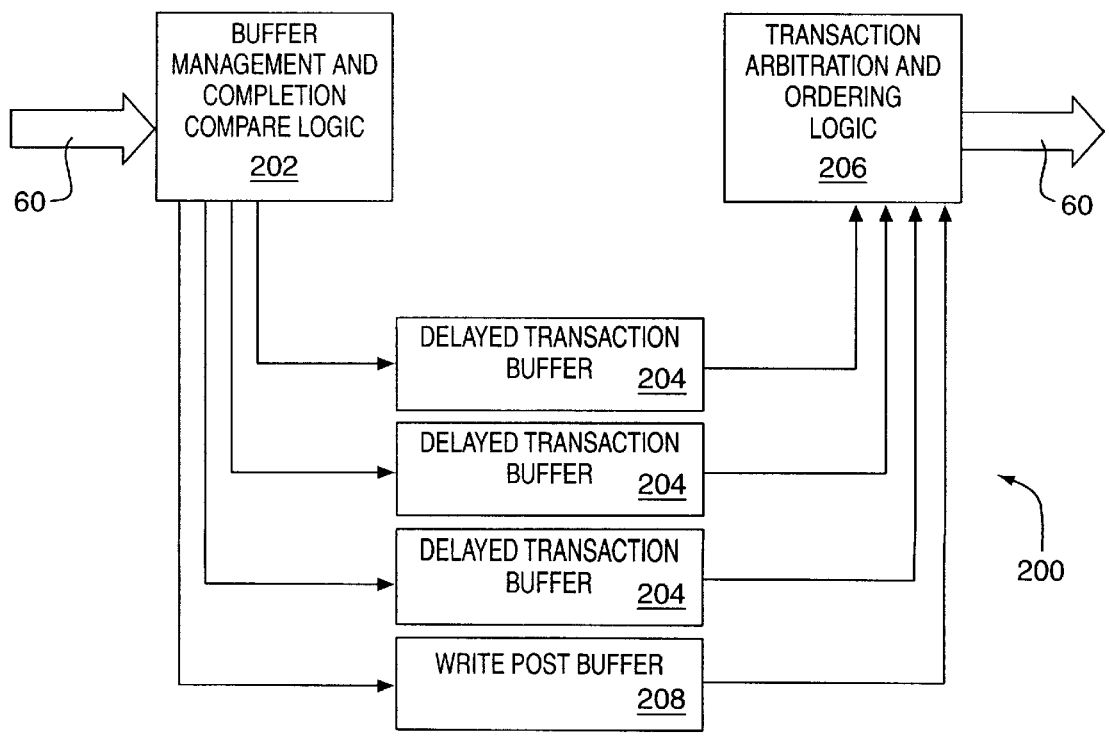
FIG. 4 illustrates delayed transaction logic of the command flow logic of FIG. 3.

FIGS. 3 and 4 provide further detail about the buffered transactions within a bridge chip of the invention, which implements multiple delayed transactions by fixing a maximum burst size, and which utilizes several internal buffers (e.g., buffers 80–90, FIG. 2A) that are the length of the maximum burst size. FIG. 3 illustrates that the PCI bridge chip 98 of FIG. 3 includes a primary PCI interface 100, coupled to PCI bus P1, and a secondary PCI interface 102 coupled to PCI bus P2 via bus. Command Data from the primary PCI interface 100 to the secondary PCI interface 102 is managed through the Primary to Secondary Delayed Transaction Logic 104; while Command Data from the secondary PCI interface 102 to the primary PCI interface 100 is managed through the Secondary to Primary Delayed Transaction Logic 106. The logics 104 and 106 are substantially identical; except for the direction of the Command Data. FIG. 4 illustrates one exemplary logic flow 200 suitable for use as either logic 104 or 106.

In FIG. 4, when a delayed transaction arrives on the PCI interface (e.g., PCI interface 100 or 102), the Buffer Management and Completion Compare Logic 202 compares the incoming request with any completed transactions in the Delayed Transaction Buffers 204 (e.g., buffers 80–90). If a match is found, the cycle is completed properly on the PCI bus. Because each transaction has its own buffer, the completion logic 202 can look for a match among all the request buffers 204 without regard as to the order the transactions were requested by the initiating bus or the order in which they were executed on the target bus.

If the transaction does not match a completed transaction, and if one of the Delayed Tansaction Buffers 204 is available, the request is entered into the buffer and the PCI Interface issues a "Retry" to the initiating device. The buffer further requests access to the target PCI bus by issuing a request to the Transaction Arbitration and Ordering Logic 206. If no buffer 204 is available, a "Retry" is issued to the initiating device, and the cycle is ignored.

The Transaction Arbitration and Ordering Logic 206 examines all requests, and based on the PCI transaction ordering rules and its internal fairness algorithm, decides which of the transactions to attempt next (without regard to the order they were received). If for some reason a request that is attempted on the target bus fails to complete, the Transaction Arbitration and Ordering Logic 206 attempts another cycle instead of waiting for completion of the failed cycle. This allows the transactions to use the bus more efficiently.

Any posted writes (which are not delayed transactions) that arrive are queued in the posted write buffer(s) 208. These writes do not follow the delayed transaction matching rules; but must compete with the delayed transactions for access to the target PCI bus. The Transaction Arbitration and Ordering Logic 206 accounts for posted writes in its determination as to which outstanding buffer gets access to the PCI bus.

Figure 5:
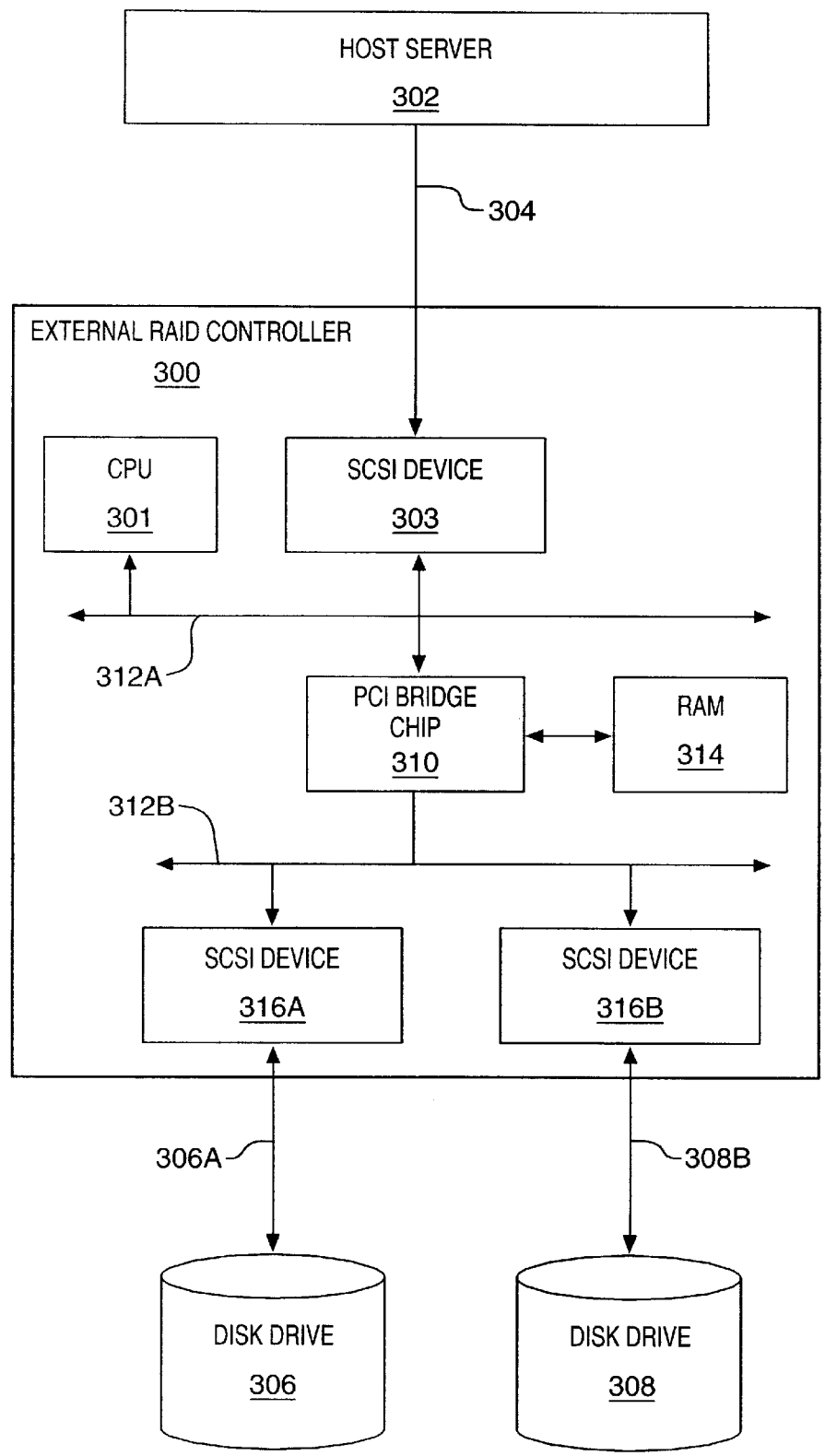
FIG. 5 illustrates a RAID controller system constructed according to the invention and utilizing the PCI bridge of FIG. 2.

FIG. 5 depicts one application of the invention in an external RAID (Redundant Array of Inexpensive or Independent Disks) controller 300 constructed according to the invention and connected to a host server 302 via SCSI device 303 and SCSI bus 304. RAID controller 300 also connects to a collection of disk drives 306, 308 which collectively act as a single storage system for the server 302 and which tolerate failure of one drive without losing data. As shown, disk drives 306, 308 couple to RAID controller 300 through SCSI buses 306a, 308a, respectively.

RAID controller 300 includes an internal CPU 301 and a PCI bridge chip 310 in the form discussed above in connection with FIGS. 2–4. As above, bridge chip 310 couples between two PCI buses 312a, 312b such as to transfer Command Data between the buses 312a, 312b. Large Burst Data, in addition, can be cached within RAM 314 connected to bridge chip 310.

SCSI devices 316a, 316b couple bus 312b to disk drives 306,308 through SCSI buses 306a, 308a, respectively. In operation, Command Data from the server 302 and/or from CPU 301 are routed through PCI bridge chip 310 in delayed buffered transactions, such as discussed above, to facilitate high I/O throughput to disk drives 306, 308.

The invention thus attains the objects set forth above, among those apparent from preceding description. Since certain changes may be made in the above systems and methods without departing from the scope of the invention, it is intended that all matter contained in the above description or shown in the accompanying drawing be interpreted as illustrative and not in a limiting sense.

In view of the foregoing, what is claimed is:

1. A PCI bridge chip configured to communicate command data and large burst data between a primary PCI bus and a secondary PCI bus, comprising:
   primary command transaction logic comprising a plurality of primary buffers and configured to receive the command data and buffer the command data in the plurality of primary buffers for selective application of command data transactions on the secondary PCI bus;
   large burst data logic configured to receive the large burst data and buffer the large burst data for access by the primary PCI bus and the secondary PCI bus; and
   a primary interface configured to receive the command data and the large burst data from the primary PCI bus, route the command data to the primary command transaction logic based on a first PCI address associated with the command data, and route the large burst data to the large burst data logic based on a second PCI address associated with the large burst data.

2. The PCI bridge chip of claim 1 further comprising secondary command transaction logic comprising a plurality of secondary buffers and configured to receive the command data and buffer the command data in the plurality of secondary buffers for selective application of the command data transactions on the primary PCI bus.

3. The PCI bridge chip of claim 2 further comprising a secondary interface configured to receive the command data and the large burst data from the secondary PCI bus, route the command data to the secondary command transaction logic based on the first PCI address, and route the large burst data to the large burst data logic based on the second PCI address.

4. The PCI bridge chip of claim 2 wherein the secondary command transaction logic further comprises secondary buffer management and completion compare logic configured to match an incoming request with completed transactions stored in the plurality of secondary buffers, and if the match is found, then the secondary buffer management and completion compare logic is configured to complete the incoming request, if the match is not found and one of the plurality of secondary buffers is available, then the secondary buffer management and completion compare logic is configured to store the incoming request in the one of the plurality of secondary buffers and issue a retry on the secondary PCI bus, and if the match is not found and none of the plurality of secondary buffers is available, then the secondary buffer management and completion compare logic is configured to issue the retry on the secondary PCI bus.

5. The PCI bridge chip of claim 2 wherein the secondary command transaction logic comprises secondary transaction arbitration and ordering logic configured to selectively apply the command data transactions stored in the plurality of secondary buffers onto the primary PCI bus.

6. The PCI bridge chip of claim 5 wherein the secondary command transaction logic further comprises at least one secondary write buffer configured to store posted writes that are not delayed transactions and wherein the secondary transaction arbitration and ordering logic is further configured to selectively apply the posted writes onto the primary PCI bus.

7. The PCI bridge chip of claim 2 wherein the secondary command transaction logic comprises three secondary buffers that are each configured to have a memory length of about 128 bytes.

8. The PCI bridge chip of claim 1 wherein the primary command transaction logic further comprises primary buffer management and completion compare logic configured to match an incoming request with completed transactions stored in the plurality of primary buffers, and if the match is found, then the primary buffer management and completion compare logic is configured to complete the incoming request, if the match is not found and one of the plurality of primary buffers is available, then the primary buffer management and completion compare logic is configured to store the incoming request in the one of the plurality of buffers and issue a retry on the primary PCI bus, and if the match is not found and none of the plurality of primary buffers is available, then the primary buffer management and completion compare logic is configured to issue the retry on the primary PCI bus.

9. The PCI bridge chip of claim 1 wherein the primary command transaction logic comprises primary transaction arbitration and ordering logic configured to selectively apply the command data transactions stored in the plurality of primary buffers onto the secondary PCI bus.

10. The PCI bridge chip of claim 9 wherein the primary command transaction logic further comprises at least one primary write buffer configured to store posted writes that are not delayed transactions and wherein the primary transaction arbitration and ordering logic is further configured to selectively apply the posted writes onto the secondary PCI bus.

11. The PCI bridge chip of claim 1 wherein the primary command transaction logic comprises three primary buffers that are each configured to have a memory length of about 128 bytes.

12. The PCI bridge chip of claim 1 wherein the large burst data logic comprises a memory configured to store the large burst data.

13. The PCI bridge chip of claim 12 wherein the memory comprises a Random Access Memory (RAM).

14. The PCI bridge chip of claim 1 wherein the command data transactions comprise read transactions.

15. A method operating a PCI bridge chip for communicating command data and large burst data between a primary PCI bus and a secondary PCI bus, the method comprising:
- receiving the command data and the large burst data from the primary PCI bus;
- routing the command data to primary command transaction logic based on a first PCI address associated with the command data;
- routing the large burst data to large burst data logic based on a second PCI address associated with the large burst data;
- buffering the command data within the primary command transaction logic using a plurality of primary buffers for selective application of command data transactions on the secondary PCI bus; and
- buffering the large burst data for access by the primary PCI bus and the secondary PCI bus.

16. The method of claim 15 further comprising:
- receiving the command data and the large burst data from the secondary PCI bus;
- routing the command data to secondary command transaction logic based on the first PCI address; and
- routing the large burst data to the large burst data logic based on the second PCI address.

17. The method of claim 16 further comprising matching an incoming request with completed transactions stored in the plurality of secondary buffers, and if the match is found, then completing the incoming request, if the match is not found and one of the plurality of secondary buffers is available, then storing the incoming request in the one of the plurality of secondary buffers and issuing a retry on the secondary PCI bus, and if the match is not found and none of the plurality of secondary buffers is available, then issuing the retry on the secondary PCI bus.

18. The method of claim 15 further comprising matching an incoming request with completed transactions stored in the plurality of primary buffers, and if the match is found, then completing the incoming request, if the match is not found and one of the plurality of primary buffers is available, then storing the incoming request in the one of the plurality of primary buffers and issuing a retry on the primary PCI bus, and if the match is not found and none of the plurality of primary buffers is available, then issuing the retry on the primary PCI bus.

19. The method of claim 18 further comprising storing posted writes that are not delayed transactions and selectively applying the posted writes onto the secondary PCI bus.

20. The method of claim 15 wherein the command data transactions comprise read transactions.

* * * * *